United States Patent [19]

Crist

Best Available Copy

[11] E Re. 30,849

[45] Reissued Jan. 19, 1982

[54] ANTI-SIPHON AND BACKFLOW PREVENTION VALVE

[75] Inventor: Buckley Crist, Plainfield, N.J.

[73] Assignee: Jaclo, Inc., Brooklyn, N.Y.

[21] Appl. No.: 219,322

[22] Filed: Dec. 22, 1980

Related U.S. Patent Documents

Reissue of:

[64] Patent No.: 3,951,164
Issued: Apr. 20, 1976
Appl. No.: 547,934
Filed: Feb. 7, 1975

[51] Int. Cl.[3] ..... F16K 24/00

[52] U.S. Cl. ..... 137/218; 137/217

[58] Field of Search ..... 137/218

[56] References Cited

U.S. PATENT DOCUMENTS

| | | | |
|---|---|---|---|
| Re. 26,235 | 7/1967 | Woodford | 137/218 |
| 833,559 | 10/1906 | Stebbins . | |
| 833,560 | 10/1906 | Stebbins . | |
| 1,160,707 | 11/1915 | Garber . | |
| 2,174,742 | 10/1939 | Groeniger | 137/218 |
| 2,259,984 | 10/1941 | Anderson . | |
| 2,449,573 | 9/1948 | White | 137/218 |
| 2,472,933 | 6/1949 | Anderson | 137/218 |
| 2,655,171 | 10/1953 | Cantor . | |
| 2,814,304 | 11/1957 | Sloan . | |
| 2,877,789 | 3/1959 | Campbell . | |
| 2,988,103 | 6/1961 | Canvasser . | |
| 2,990,843 | 7/1961 | Smith . | |
| 3,025,870 | 3/1962 | Mackey . | |
| 3,145,724 | 8/1964 | Pelzer . | |
| 3,171,424 | 3/1965 | Shames et al. | 137/218 |
| 3,172,128 | 3/1965 | Ducey | 137/218 X |
| 3,180,355 | 4/1965 | Long . | |
| 3,183,924 | 5/1965 | Duchin . | |
| 3,414,003 | 12/1968 | Wyckoff . | |
| 3,454,032 | 7/1969 | Hinz et al. . | |
| 3,491,788 | 1/1970 | Kilayko | 137/218 |
| 3,543,786 | 12/1970 | Woodford . | |
| 3,550,616 | 12/1970 | Graham et al. . | |
| 3,559,673 | 2/1971 | Perlman | 137/218 |
| 3,565,097 | 2/1971 | Costa . | |
| 3,572,377 | 3/1971 | Graham et al. . | |
| 3,633,613 | 1/1972 | Julow | 137/512 |
| 3,670,760 | 6/1972 | Butcher et al. . | |
| 3,818,929 | 6/1974 | Braukmann . | |
| 3,850,190 | 11/1974 | Carlson . | |
| 3,918,477 | 11/1975 | Grams . | |
| 3,952,766 | 4/1976 | Johnson . | |

FOREIGN PATENT DOCUMENTS

| | | | |
|---|---|---|---|
| 527201 | 10/1940 | United Kingdom | 137/218 |
| 851504 | 10/1960 | United Kingdom . | |

*Primary Examiner*—Gerald A. Michalsky
*Attorney, Agent, or Firm*—Gottlieb, Rackman & Reisman

[57] ABSTRACT

An anti-siphon and back-flow prevention valve having a main valve chamber including air ports, an inlet at its lower end and an outlet at its upper end. Contained within the main valve chamber is a check valve including a check valve seat, through which the flow of liquid in the valve must pass. The check valve seat has a flexible diaphragm which mates with the check valve seat and functions to block any back flow of liquid from the main valve chamber into the inlet. A flexible ring is also contained in the main valve chamber and mates with the air ports to function as an air valve, allowing air to enter the main valve chamber during low pressure conditions down stream from the valve. The check valve and air valve operate independently of each other, responding to the various air and liquid pressures in and around the main valve chamber. Both valves are normally held closed by the force of gravity and static water pressure within the main valve chamber during no-flow conditions.

8 Claims, 6 Drawing Figures

ANTI-SIPHON AND BACKFLOW PREVENTION VALVE

Matter enclosed in heavy brackets [ ] appears in the original patent but forms no part of this reissue specification; matter printed in italics indicates the additions made by reissue.

BACKGROUND OF THE INVENTION

The present invention relates to an improved anti-siphon and back flow prevention valve for use in plumbing systems and more specifically to such a valve having an air valve and check valve where both valves operate independently of each other.

Anti-siphon and back flow prevention valves have been in use for some time and are generally used in plumbing systems. Such valves are often required by local health and sanitary codes. The valves prevent the contamination of the liquid supply upstream from the valve due to liquid back-flow and contamination of the supply line downstream from the valve due to siphoning.

Such valves commonly incorporate an air valve to permit the entry of air into line under pressure conditions that would otherwise permit a liquid to siphon upstream to the valve. They also incorporate a check valve to prevent liquid from passing upstream through the valve to the supply.

Such valves frequently use diaphragms, springs and cams to detect water pressure upstream from the valve and to close a normally open air valve before liquid reaches the valve, in order to prevent the liquid from leaking through the air valve during normal flow conditions. In such valves the possibility of leakage under low liquid pressure conditions or when the flow is started is always present. Moreover, these valves are often large and expensive and tend to reduce the liquid pressure across the valve. This renders these valves particularly unsuitable for plumbing installations in areas of limited space and possible low liquid pressure conditions such as in mobile homes and other similar recreational vehicles. The possibility of leakage from the air ports under low liquid pressure conditions likewise limits the utility and consumer acceptance of such valves in these applications.

Most existing valves use a single diaphragm to provide both the air valve and check valve functions and are therefore subject to the above limitations, notably leakage during low pressure conditions and start-up and pressure reduction through the valve. U.S. Pat. No. 2,174,742 discloses a valve which incorporates separate diaphragms for the air valve and check valve. In this valve, however, both diaphragms are normally open during no-flow conditions. The check valve closes only upon the start of backflow, thereby permitting an initial contamination of the line upstream. The air valve requires a finite amount of liquid pressure acting on it before it closes off its air ports completely. Therefore, leakage of liquid through the air valve is possible under low liquid pressure conditions or when the liquid flow has initially started.

SUMMARY OF THE INVENTION

The improved valve consists of a main valve chamber, including a check valve chamber and an air valve chamber. At the lower end of the main valve chamber there is an inlet permitting the entry of liquid and at the upper end is an outlet permitting the exit of liquid from the main valve chamber. Contained in the check valve chamber is a check valve seat. A plurality of air ports surround the inlet in the body of the main valve chamber and a flexible ring is located in the air valve chamber and can mate with the air ports. Located above the check valve seat and able to mate with it, is a flexible diaphragm.

During no-flow conditions, the flexible ring is held against the air ports by the force of gravity and the weight of liquid above it in the air valve chamber. This blocks the entry of air into, and the exit of liquid from, the air valve chamber. The leakage of liquid through the air ports is thereby prevented during these conditions.

Whenever there is negative pressure downstream of the valve, the pressure differential forces the ring away from the air ports permitting the entry of air through these air ports into the main valve chamber. This equalizes the pressure differential and prevents the occurrence of siphoning.

During no-flow conditions the flexible diaphragm mates with the check valve seat and is held in contact with the seat by the weight of liquid above it and the force of gravity. This action blocks the passage through the check valve seat and prevents the liquid in the line downstream, from flowing back upstream. In addition, the ring is flexible and tends to seat in conformity with the shape of the check valve seat providing a seal which is not subject to leakage as a result of the presence of any foreign matter on the check valve seat.

During normal flow conditions, the liquid pressure in the inlet of the main valve chamber pushes the disphragm away from the check valve seat allowing the flow of liquid out of the valve into the check valve chamber and then downstream.

In the improved valve the air valve and check valve operate independently. Both valves are normally closed during no-flow conditions, preventing the back flow of liquid upstream from the valve and also preventing the leakage of liquid from the valve through the air ports, both during these conditions and during initial flow conditions when the liquid pressure may be temporarily small.

Moreover; due to the light weight of the flexible diaphragm and its free movement above the check valve seat there is a relatively low liquid pressure drop through the check valve chamber. Similarly, the flexible ring is responsive to small pressure differentials and thereby provides positive protection against siphoning. Because of its simplicity of operation, the valve can be manufactured in a small and inexpensive package and is therefore particularly suitable for application in recreational vehicles or other facilities of limited space.

Figure 1:
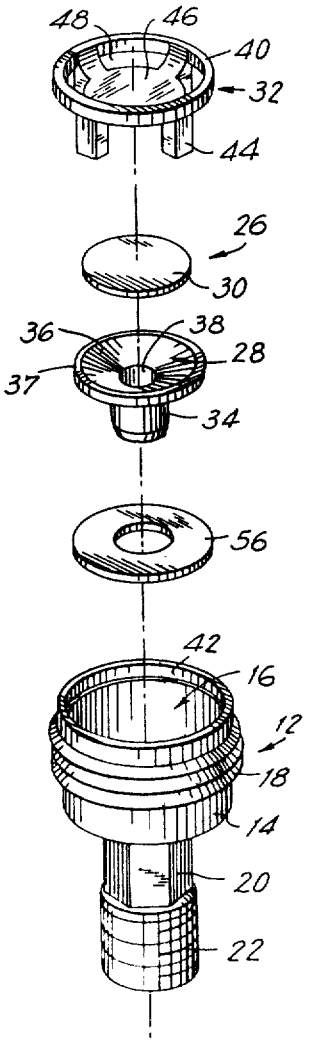
FIG. 1 is an exploded view of the valve.
Figure 2:
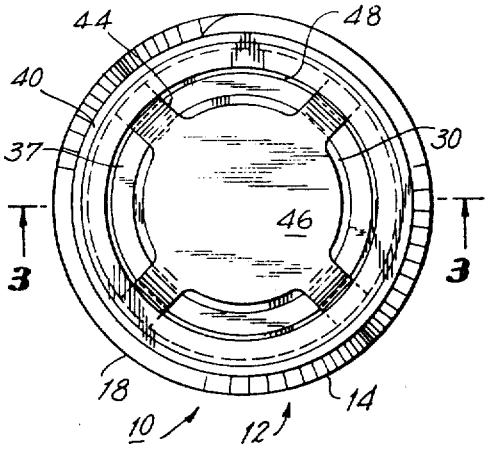
FIG. 2 is a top plan view of the valve.

Referring to the drawings, an anti-siphon and backflow prevention valve 10, desirably formed primarily of plastic, includes a valve body 12 defined in part by a tubular external wall 14. This external wall 14 surrounds and defines a main valve chamber 16 within the valve 10. The wall 14 carries threads 18 on its exterior so that it may be mated into a plumbing system.

Depending downwardly from the integral with the valve body 12 is an inlet 20, of tubular configuration. The inlet 20 is also externally threaded as at 22 for mating into the plumbing system. The inlet 20 has an internal passageway 24 which leads generally into the valve chamber 16.

A check valve, generally 26, is situated within the valve body 12 and includes a check valve seat 28, a check valve diaphragm 30, and a check valve diaphragm retainer 32. The check valve seat 28 includes a lower tubular stem 34 and an upper funnel 36, the funnel terminating at its upper end in a flat 37, through which an internal passageway 38 runs. The stem is tapered at its lower end, and the stem 34 fits snugly into an enlarged diameter upper portion 40 of the inlet passageway 24. The check valve diaphragm 30 is relatively thin and flexible, being desirably composed of a low durometer rubber. If any obstacle such as foreign debris should become located on the check valve seat, the diaphragm will collapse about it, substantially checking reverse flow. It is retained in alignment with the check valve seat 28 by the check valve diaphragm retainer 32, also located within the valve body 12. The retainer includes an upper ring 40, having an external circumference which fits snugly into a shoulder 42 internally situated at the upper end or the outlet 43 of the valve body 12.

Figure 3:
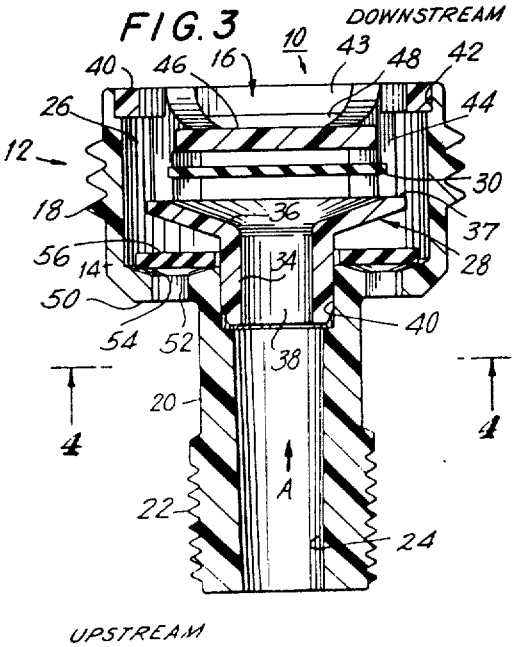
FIG. 3 is a vertical cross sectional view of the valve along the line 3—3 of FIG. 2 showing the valve during normal flow conditions with the air valve closed and the check valve open.

A number, desirably four, legs 44 depend downwardly from the ring 40, and terminate coextensively at the upper flat 37 of the funnel 36 of the check valve seat 28. About midway of their lengths, the legs 44 join to a retainer plate 46, the plate as best seen in FIG. 3 being located below the upper end of the valve body 12 and above the check valve seat 36. The check valve diaphragm 30 is held against lateral movement by the portions of the legs 44 below the plate 46, and is limited in its upper movement by the plate 46. Openings 48 defined by the ring and the plate enable flow through the check valve. The retainer 32 and the check valve seat 28 all define a check valve chamber within which the check valve diaphragm 30 moves, to open and close the check valve 26.

Figure 4:
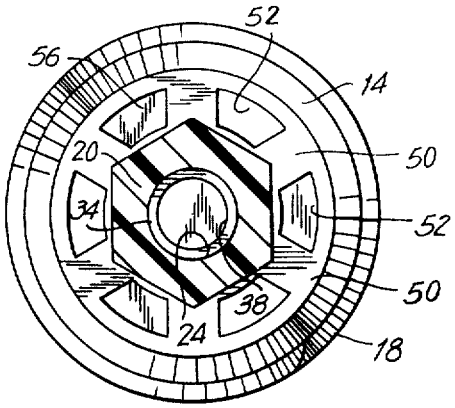
FIG. 4 is a cross sectional view of the valve along the line 4—4 in FIG. 3.

The valve body 14 has a bottom wall 50 which surrounds the inlet 20, and which has a number, desirably six, air ports 52 therein, see FIG. 4. The upper portions of the air ports 52 are depressed as at 54. Situated over the air ports 52, and surrounding the stem 34 of the check valve seat 28 is an air valve ring 56. The upper face of the bottom wall 50, the inner face of the valve body wall 14 and the outer face of the check valve seat 28 at its funnel 36 all define an air valve chamber, serving to limit movement of the air valve ring 56. The check valve seat, at its funnel-shaped portion 36, overhangs the air valve ring 56, preventing flow effects, such as back flow or turbulence from acting on the ring. Desirably, the ring 56 or the air ports 52 are covered with a thin layer of a lubricant such as silicone grease. This prevents sticking at low pressures, and prevents sticking after long periods of non-use.

Having described the various structural components of the valve, its operation may now be briefly reviewed.

Figure 6:
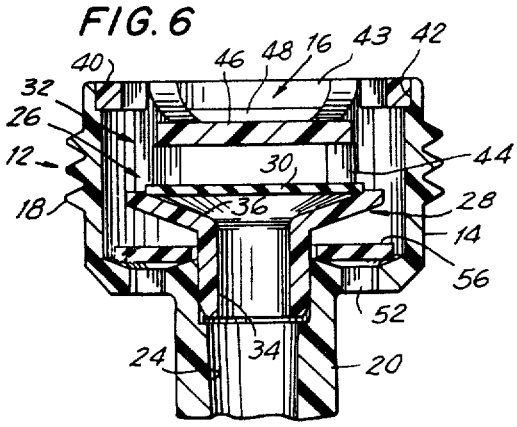
FIG. 6 is a partial vertical cross section of the valve, similar to FIG. 3 showing both the air valve and check valve in the closed position, during no-flow conditions.

Under no-flow conditions, shown in FIG. 6, the air valve ring 56 mates with and thus closes the air ports 52, the ring being held in this position by the force of gravity and the static liquid pressure above it. Further, the check valve diaphragm 30 mates with the check valve seat 28 and thus closes the check valve 26, preventing any back flow of liquid upstream through the inlet 20. This of course prevents contamination of the source of liquid supply. In actual practice, both the ring 56 and the diaphragm 30 come into close face-to-face contact with their opposed funnel-shaped members, but are shown somewhat ideally, i.e., non-flexed, in the drawings.

Under normal flow conditions, shown in FIG. 3, the air valve ring 56 remains in place, being out of the way of any flow, and being shielded from disturbing turbulance by the overhanging funnel 36 of the check valve seat 28. Normal flow runs through inlet 20 in the direction A, through the passageway 38 in the check valve seat 28, lifts the diaphragm 30 away from said seat, and continues past the legs 44 of the retainer, through the retainer openings 48, and then further downstream.

Figure 5:
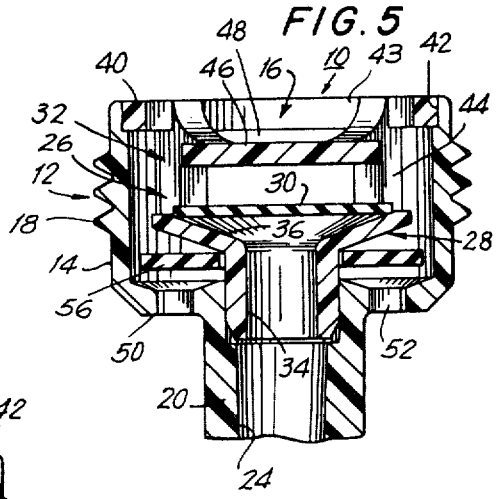
FIG. 5 is a partial vertical cross section of the valve, similar to FIG. 3 but showing the air valve in the open position and the check valve in the closed position, in a mode to prevent siphoning.

Should, during non-flow conditions, a low-pressure condition arise downstream, which might cause undesirable siphoning, the air valve opens. As best seen in FIG. 5, atmospheric pressure on the exterior of the air valve would press against the air valve ring 56, moving the ring away from the air ports 52 since this atmospheric pressure is greater than the low pressure existing downstream. Opening of the air ports 52 permits entry of air through the air valve chamber and then through flow openings 48, equalizing pressure on the upstream and downstream sides of the valve. During this time, the check valve is retained closed by the diaphragm 30, being unaffected by the movement of the air valve ring 56. Since the air valve ring 56 is essentially free floating, it is able to open under low negative pressure. It is also able to close under low positive pressure.

It will thus be seen that the air valve and the check valve work completely independently of one another, each able to respond quickly to various pressures and conditions of flow, while both being closed during no flow conditions, so as to prevent accidental leaking. No leaking is therefore likely during start-up or initial sensing of a different flow or pressure condition. The foregoing has been achieved with a device having few parts, being small in size and being economical to manufacture. The latter is particularly true, since the valve is desirably formed of plastic, except for the air valve ring and the check valve diaphragm, which may be stamped from rubber.

What is claimed is:

1. A valve for preventing backflow and siphoning, comprising:

a. a valve body, b. check valve means within the valve body, the check valve means including a seat, a diaphragm in alignment with the seat, and diaphragm retaining means, said retaining means including a plate and spaced legs depending from said plate and contacting the seat, the diaphragm being captured for limited movement between the plate and the seat, and c. air valve means within the valve body and operating independently of the check valve means, said air valve means including at least one air port in the valve body, a seat surrounding the air port, and a closing member in alignment with the air port, the member normally mating with the air port seat and opening during a downstream low pressure condition to permit equalization.

2. A valve as set forth in claim 1 wherein the air valve means is circumferentially disposed about the check valve means.

3. A valve as set forth in claim 2, wherein the check valve means include a funnel shaped check valve seat, the air valve means being disposed about the check valve seat.

4. A valve as set forth in claim 3, wherein there are a number of air ports being depressed, the air ports surrounding the check valve seat.

5. A valve as set forth in claim 4 wherein a lubricant is situated between the air valve closing member and the air ports.

6. A valve as set forth in claim 1 wherein the seat of the check valve means overhangs the air valve closing member and comprises a stop to limit movement of said closing member.

7. A valve for preventing backflow and siphoning, comprising:

a. a valve body defining a chamber, the valve body including an inlet leading into the chamber and an outlet leading out of the chamber, and at least one air port in the chamber, b. a first flow path running from the inlet through the chamber to the outlet, c. check valve means located within the chamber and controlling flow in *and normally closing* the first flow path, d. a second flow path running from the air port, bypassing the check valve means, through the chamber to the outlet, and e. air valve means operable independently of the check valve means and operative hydraulically downstream of the check valve means, the air valve means including a closing member located across the second flow path in alignment over *and normally closing* the air port, the closing member being mated against the air port to prevent flow in the second flow path during a positive pressure condition within the chamber and being opened by a negative pressure condition in the second flow path to permit pressure equalization.

8. A valve as set forth in claim 7 wherein the valve body includes a plurality of air ports, said air ports circumferentially surrounding the check valve, the second flow path leading from said air ports through the chamber to the outlet.

* * * * *